United States Patent
Nakabayashi et al.

(10) Patent No.: US 10,649,074 B2
(45) Date of Patent: May 12, 2020

(54) TARGET DETECTOR AND TARGET DETECTION METHOD FOR DETECTING TARGET USING RADAR WAVES

(71) Applicant: DENSO CORPORATION, Kariya, Aichi-pref. (JP)

(72) Inventors: Kento Nakabayashi, Kariya (JP); Yasuyuki Miyake, Kariya (JP); Yoshie Samukawa, Kariya (JP); Akiyoshi Mizutani, Kariya (JP); Yosuke Ito, Kariya (JP); Kei Tamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 381 days.

(21) Appl. No.: 15/325,913

(22) PCT Filed: Jul. 16, 2015

(86) PCT No.: PCT/JP2015/070382
§ 371 (c)(1),
(2) Date: Jan. 12, 2017

(87) PCT Pub. No.: WO2016/010109
PCT Pub. Date: Jan. 21, 2016

(65) Prior Publication Data
US 2017/0146646 A1 May 25, 2017

(30) Foreign Application Priority Data
Jul. 16, 2014 (JP) .................... 2014-145975

(51) Int. Cl.
*G01S 13/34* (2006.01)
*G01S 7/35* (2006.01)
(Continued)

(52) U.S. Cl.
CPC .............. *G01S 13/34* (2013.01); *G01S 7/35* (2013.01); *G01S 7/354* (2013.01); *G01S 13/584* (2013.01);
(Continued)

(58) Field of Classification Search
CPC ...... G01S 13/34; G01S 13/584; G01S 13/931; G01S 2007/356; G01S 7/35; G01S 7/354
(Continued)

(56) References Cited

U.S. PATENT DOCUMENTS

2002/0180633 A1* 12/2002 Nakanishi ............... G01S 7/352
342/70
2002/0186362 A1 12/2002 Shirai et al.
2004/0174291 A1 9/2004 Isaji

FOREIGN PATENT DOCUMENTS

JP  3788322 B  6/2006

OTHER PUBLICATIONS

A Self Organizing Approach to Measuring Long-Range Dependence in IP Traffic using Fluctuation Analysis, Masao Masugi, FIT2004, in 5 pages.

* cited by examiner

*Primary Examiner* — Timothy A Brainard
(74) *Attorney, Agent, or Firm* — Knobbe, Martens, Olson & Bear, LLP

(57) ABSTRACT

A radar device includes a transmitting unit, a receiving unit, and a signal processor. The transmitting unit transmits a radar wave. The receiving unit mixes the received incoming wave with the radar wave to generate a beat signal. The signal processor executes a target detection process to detect a target having reflected the radar wave. In the target detection process, a signal value is extracted from the beat signal generated by the receiving unit for each of specified times, the specified time being a reciprocal of a DC com- (Continued)

ponent frequency, an approximation curve of a plurality of the signal values is calculated as a DC component signal, and the calculated DC component signal is subtracted from the beat signal to generate a target signal. Based on a result of frequency analysis performed on the target signal, a target that is a source of the incoming wave is detected.

13 Claims, 5 Drawing Sheets

(51) Int. Cl.
     *G01S 13/58*       (2006.01)
     *G01S 13/931*     (2020.01)
(52) U.S. Cl.
     CPC ....... *G01S 13/931* (2013.01); *G01S 2007/356* (2013.01)
(58) Field of Classification Search
     USPC .......................................... 342/107
     See application file for complete search history.

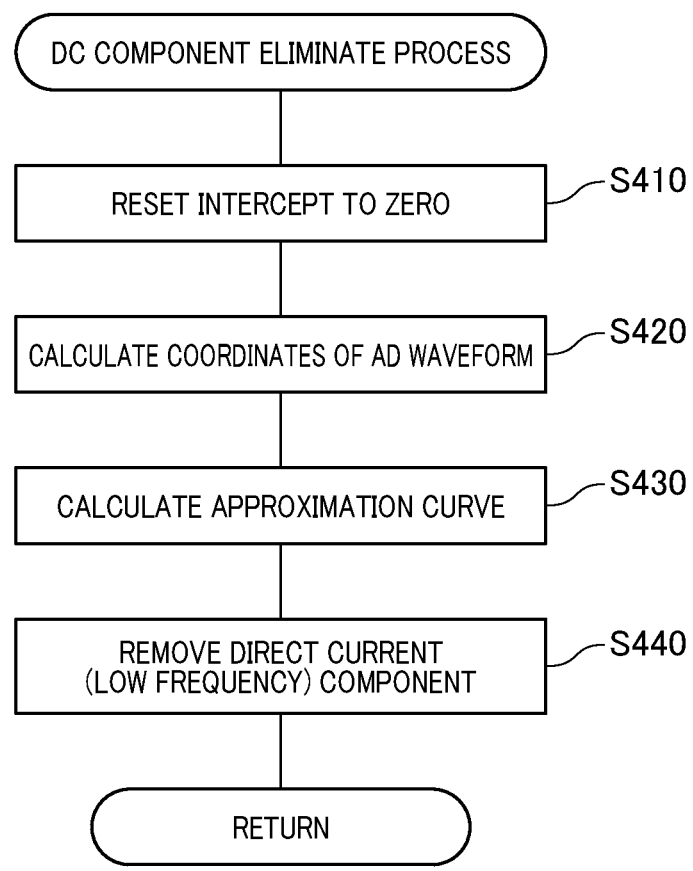

TARGET DETECTOR AND TARGET DETECTION METHOD FOR DETECTING TARGET USING RADAR WAVES

CROSS-REFERENCE TO RELATED APPLICATION

This application is based on and claims the benefit of priority from earlier Japanese Patent Application No. 2014-145975 filed Jul. 16, 2014, the description of which is incorporated herein by reference.

BACKGROUND OF THE INVENTION

Technical Field

The present disclosure relates to a target detector configured to detect a target, based on a result of transmitting and receiving radar waves.

Background Art

A conventionally known target detector includes a transmitting unit, a receiving unit, and a signal processor. The transmitting unit transmits a radar wave formed of continuous waves at a specified cycle. The receiving unit receives an incoming wave, and mixes the incoming wave with the radar wave, to generate a beat signal. The signal processor detects a target that is a source of the incoming wave, based on a result of frequency analysis performed on the beat signal.

For example, JP-B-3788322 describes a target detector in which a specific value is subtracted from a beat signal generated by a receiving unit before the beat signal is subjected to frequency analysis. In the target detector described in the Patent Literature, the specific value is the mean value of the signal levels of all the beat signals.

CITATION LIST

Patent Literature

PTL 1: JP-B-3788322

In conventional target detectors, a beat signal generated based on an incoming wave from a nearby target present at short distance is buried in direct current (DC) noise. This results in such conventional target detectors failing to detect accurately the nearby target.

In the target detector described in PTL 1, the mean value of the signal levels of all the beat signals is subtracted from the beat signal so that DC noise is removed from the beat signal.

However, when only the mean value of the signal levels of all the beat signals is subtracted from all the beat signals, incoming wave components from a target at a very short distance (for example, the bumper of an automobile or the cover of the target detector) remain in the beat signal. Thus, even when a target is present in a range within which a target is supposed to be detected, the target detector cannot detect the incoming wave from the target in the range because the incoming wave from the target in the range is buried in the incoming wave components from a target at a very short distance.

Accordingly, in the conventional techniques, the accuracy of detecting a target needs to be improved.

SUMMARY

The present disclosure provides a target detector having an improved accuracy of detecting a target.

A target detector of the present disclosure includes a transmitting means (32, 33, 34, 36), a receiving means, a direct current calculating means, a signal generating means, and a first detecting means.

The transmitting means transmits a radar wave formed of continuous waves at a specified cycle. The receiving means receives an incoming wave that is a reflected wave of the radar wave transmitted from the transmitting means. The receiving S410 means mixes the incoming wave with the radar wave transmitted from the transmitting means, to generate a beat signal.

The direct current calculating means extracts a signal value from the beat signal generated by the receiving means, for each of specified times each being a reciprocal of a DC component frequency, and calculates an approximation curve of a plurality of extracted signal values as a DC component signal. The signal generating means subtracts the DC component signal calculated by the direct current calculating means from the beat signal generated by the receiving means, to generate a target signal.

The first detecting means detects a first target that is a source of the incoming wave, based on a result of frequency analysis performed on the target signal generated by the signal generating means.

The direct current calculating means of the present disclosure calculates an approximation curve of the plurality of signal values as a DC component signal, based on a plurality of signal values extracted for each of the specified times. The DC component signal is obtained by passing the beat signal through a low-pass filter having the cutoff frequency set to the frequency of the DC component. In the present disclosure, the target signal is obtained by removing the DC component from the beat signal. As used herein, the "DC component" is a frequency component corresponding to an incoming wave from a target at a very short distance.

Therefore, according to the target detector of the present disclosure, an incoming wave from a nearby target is less likely to be buried in an incoming wave from a target at a very short distance. Consequently, the target detector of the present disclosure has an improved accuracy of detecting a nearby target at a short distance within which a target is supposed to be detected.

In the target detector of the present disclosure, a target signal to be subjected to frequency analysis is obtained by subtracting, from a beat signal, an incoming wave component received from a target at a very short distance. This configuration of the target detector according to the present disclosure inhibits decrease in the level of a beat signal generated based on an incoming wave from a target at a long distance within which a target is supposed to be detected.

This configuration of the target detector according to the present disclosure thus prevents reduction in accuracy of detecting a target at a long distance within which a target is supposed to be detected.

As described above, the target detector of the present disclosure has an improved accuracy of detecting a target.

Reference signs in parentheses are used in the "CLAIMS" and "Solution to Problem". The reference signs merely illustrate the correspondence with specific means described in an embodiment set forth below as a mode, and thus are not intended to limit the technical scope of the present disclosure.

BRIEF DESCRIPTION OF DRAWINGS

In the accompanying drawings:

FIG. 3 is a flowchart of a DC component reduction process.

DETAILED DESCRIPTION OF THE PREFERRED EMBODIMENTS

With reference to the accompanying drawings, an embodiment of the present disclosure will now be described.

Figure 1:
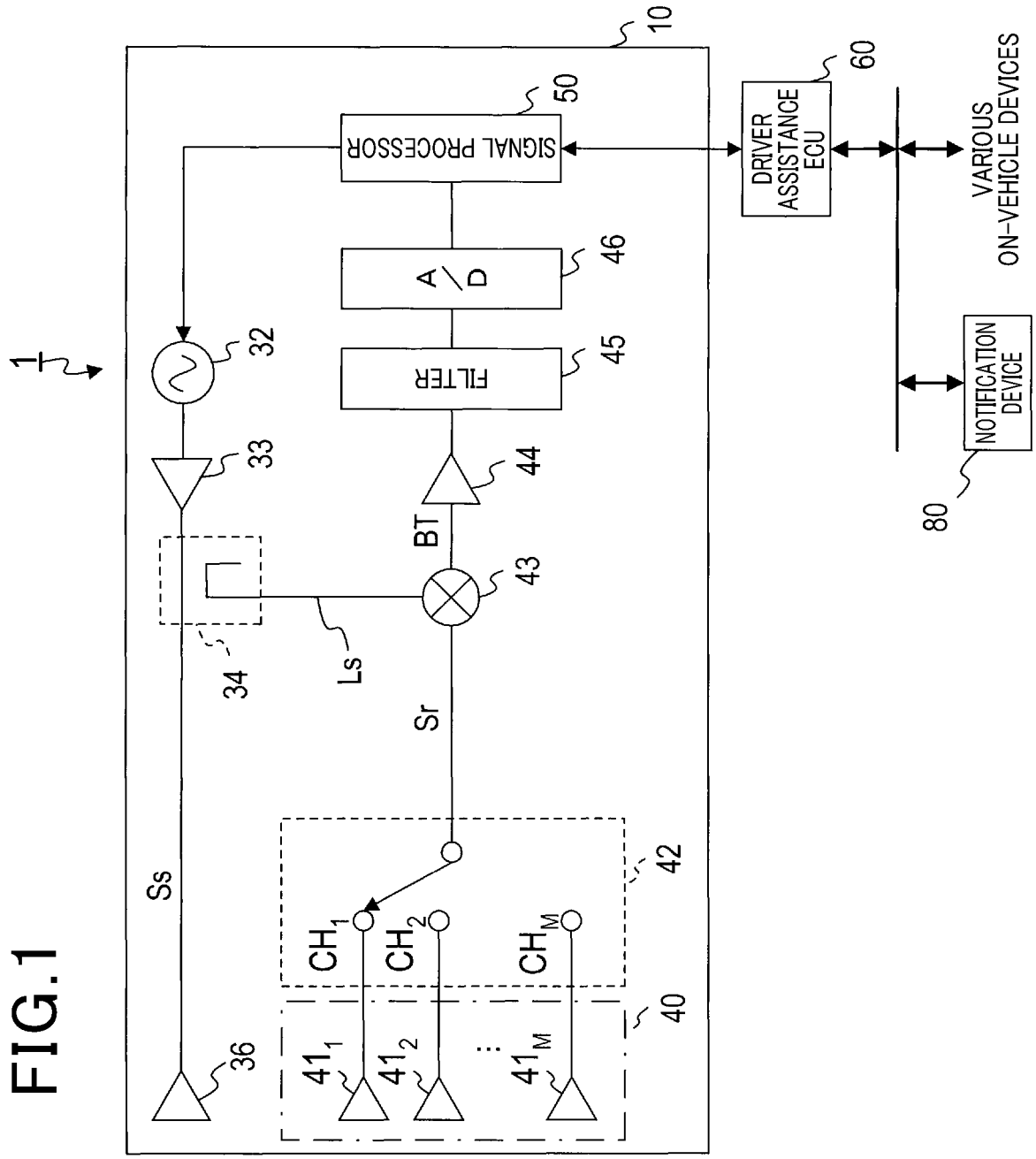
FIG. 1 is a diagram illustrating a schematic configuration of a target detector to which the present disclosure is applied.

An on-vehicle system 1 illustrated in FIG. 1 includes a radar device 10, a driver assistance electronic control unit (ECU) 60, and a notification device 80. The on-vehicle system 1 implements known driver assistance control such as adaptive cruise control (ACC) and pre-crash safety system (PCS).

<Radar Device>

The radar device 10 is a millimeter wave radar mounted to an automobile. The radar device 10 transmits, as a radar wave, continuous waves formed of electromagnetic waves in the millimeter wave range, and detects a target, based on a result of receiving a radar wave (incoming wave which has been reflected off the target. The radar device 10 is an example of the target detector described in the claims.

The radar device 10 includes an oscillator 32, an amplifier 33, a divider 34, and a transmission antenna 36.

The oscillator 32 generates a high frequency signal in the millimeter wave range such that the high frequency signal is modulated to have a modulation cycle including a rising section, in which the frequency linearly increases (gradually increases) with time, and a falling section, in which the frequency linearly decreases (gradually decreases) with time. The amplifier 33 amplifies the high frequency signal generated by the oscillator 32.

The divider 34 divides power of the output of the amplifier 33 into a transmission signal Ss and a local signal Ls. The transmission antenna 36 radiates a radar wave corresponding to the transmission signal Ss.

The radar device 10 further includes a reception antenna unit 40, a reception switch 42, a mixer 43, an amplifier 44, a filter 45, an analog-to-digital (A/D) converter 46, and a signal processor 50.

The reception antenna unit 40 includes M antennas $41_1$ to $41_M$ (M is a natural number greater than or equal to 2) configured to receive radar waves. Channels $CH_1$ to $CH_M$ are respectively allocated to the antennas $41_1$ to $41_M$.

The reception switch 42 sequentially selects any one of the antennas $41_1$ to $41_M$, and supplies a reception signal Sr from the selected one of the antennas $41_1$ to $41_M$ to a subsequent stage.

The mixer 43 mixes the reception signal Sr amplified by the amplifier 44 with the local signal Ls, to generate a beat signal BT indicating the difference in frequency between the transmission signal Ss and the reception signal Sr. The amplifier 44 amplifies the beat signal BT supplied from the mixer 43. The filter 45 removes unnecessary signal components from the beat signal BT generated by the mixer 43. The A/D converter 46 samples the output of the filter 45 and converts the sampled data to digital data.

The signal processor 50 includes at least one known microcomputer having at least a ROM, a RAM, and a CPU. The signal processor 50 includes at least one arithmetic unit (for example, a digital signal processor (DSP)) configured to subject data acquired via the A/D converter 46 to, for example, fast Fourier transform (FFT).

The signal processor 50 controls the activation and deactivation of the oscillator 32 and the sampling of the beat signals BT via the A/D converter 46. Besides the control operations, the signal processor 50 performs signal processing using sampled data and performs information communication processing to transmit and receive information necessary for the signal processing (for example, vehicle speed) and target information obtained as a result of the signal processing between the signal processor 50 and the driver assistance ECU 60.

The signal processor 50 detects a target having reflected a radar wave, using the sampled data of the beat signal BT, and performs a target detection process to generate target information on the target.

Programs are stored on the ROM of the signal processor 50 for execution of the target detection process by the signal processor 50.

<Outline of the Operation of the Radar Device>

In the radar device 10, upon oscillation of the oscillator 32 in response to a command from the signal processor 50, the divider 34 divides power of a high frequency signal generated by the oscillator 32 and amplified by the amplifier 33, to generate a transmission signal Ss and a local signal Ls. In the radar device 10, the transmission signal Ss is transmitted as a radar wave via the transmission antenna 36.

The radar wave transmitted from the transmission antenna 36 and reflected off a target, that is, an incoming wave, is received by all the antennas $41_1$ to $41_M$ constituting the reception antenna unit 40. Only the reception signal Sr of the reception channel $CH_i$ (i=1 to M) selected by the reception switch 42 is amplified by the amplifier 33, and then supplied to the mixer 43. The mixer 43 mixes the reception signal Sr with the local signal Ls from the divider 34, to generate a beat signal BT. After unnecessary signal components are removed from the beat signal BT by the filter 45, the beat signal BT is sampled by the A/D converter 46, and taken into the signal processor 50.

The reception switch 42 is switched so as to select all the channels $CH_1$ to $CH_M$ each for a predetermined number of times (for example, 512 times) during a modulation cycle of the radar wave. The A/D converter 46 samples data in synchronization with the switching timing. In other words, during a modulation cycle of the radar wave, sampling data is accumulated for each of the channels $CH_1$ to $CH_M$ and in each of the rising and the falling sections of the radar wave.

Based on the sampled value of the beat signal BT, the signal processor 50 detects the target having reflected the radar wave, and derives a distance to the target, relative velocity to the target, and an azimuth in which the target is present (hereinafter referred to as "direction of arrival"). The signal processor 50 then outputs, as target information, information including these pieces of information on the target (the distance, relative velocity, and direction of arrival) to the driver assistance ECU 60.

As described above, the radar device 10 is configured as a frequency-modulated continuous-wave (FMCW) radar.

The driver assistance ECU 60 controls other on-vehicle controllers and other on-vehicle devices, to implement driver assistance control. Adaptive cruise control (ACC), which is a driver assistance control system, maintains a specified distance between a leading vehicle and an own vehicle. A pre-crash safety system (PCS), which is a driver assistance control system, reinforces the braking force of the own vehicle and the restraining force of the seatbelt in the case where a collision is unavoidable between the own vehicle and an obstacle on the road on which the own vehicle travels.

The notification device 80 is a known device configured to provide information in response to a control signal. The notification device 80 includes, for example, at least one of a display device configured to display information and a speech output device configured to output information in audible form. The display device of the present embodiment includes, for example, a display and a display lamp (a waning lamp).

<Target Detection Process>

The target detection process executed by the signal processor 50 of the radar device 10 will now be described.

The target detection process is initiated cyclically, that is, at a measurement cycle.

Figure 2:
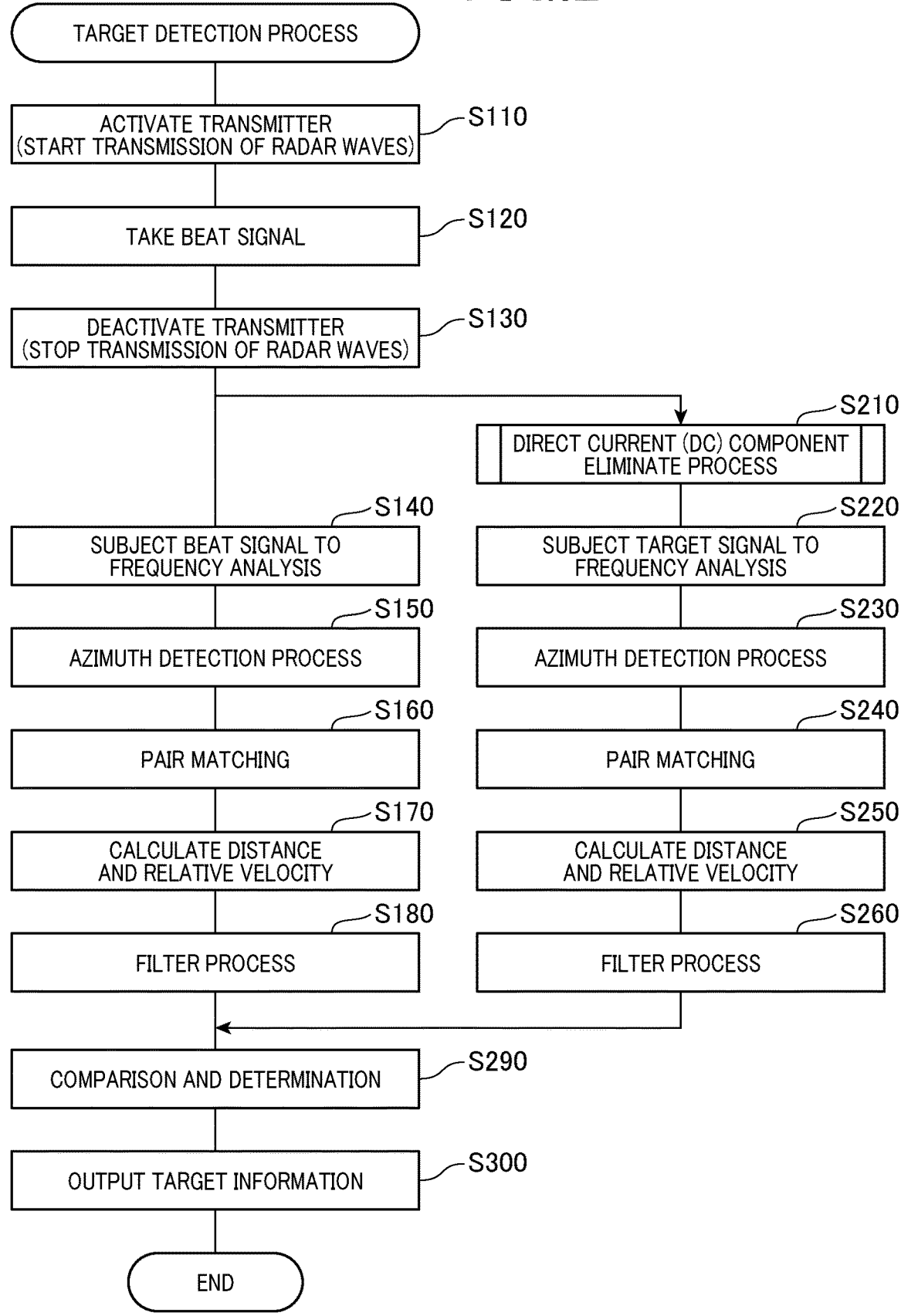
FIG. 2 is a flowchart of a target detection process.

As illustrated in FIG. 2, upon initiation of the target detection process, the oscillator 32 is first activated to start the transmission of radar waves (S110). Sampled values of the beat signal BT is then acquired via the A/D converter 46 (S120). Upon acquisition of a necessary amount of sampled values of the beat signals BT, the oscillator 32 is deactivated to stop the transmission of radar waves (S130).

Subsequently, in the target detection process, a first detection process (S210 to S260) and a second detection process (S140 to S180) are executed using parallel processing. The "parallel processing", as used herein, may be implemented such that one microcomputer (or a DSP) of the signal processor 50 executes the first and second detection processes simultaneously. Alternatively, the "parallel processing" may be implemented such that a plurality of microcomputers (or DSPs) of the signal processor 50 individually execute the first and second detection processes.

In the first detection process, a target is detected based on a result of frequency analysis performed on a signal obtained by removing DC components from a beat signal (the processed beat signal is hereinafter referred to as "target signal"). In the second detection process, a target is detected based on a result of frequency analysis performed on a beat signal.

<Second Detection Process>

In the second detection process, the sampled values of the beat signals BT acquired in S130 are subjected to frequency analysis (in the present embodiment, FFT), and the power spectrum of the beat signal BT is obtained for each of the reception channels $CH_1$ to $CH_M$ and in each of the rising and the falling sections (S140). The power spectra expresses frequencies included in the beat signal BT and the intensity of the frequencies.

In S140, frequency peaks $fbu_1$ to $fbu_m$ present on the power spectrum are detected in the rising section, and frequency peaks $fbd_1$ to $fbd_m$ present on the power spectrum are detected in the falling section. The detected frequency peaks fbu and fbd each mean that a candidate for a target that is a source of the reflected wave is possibly present (such a candidate is hereinafter referred to as "target candidate").

Subsequently, in the target detection process, an azimuth detection process is executed for each of the frequency peaks fbu and fbd, to estimate both the direction of arrival of a target candidate corresponding to the frequency peaks fbu and fbd and incoming power expressing the received power of the incoming wave from the target candidate (S150). For the azimuth detection process, for example, a method such as multiple signal classification (MUSIC) and digital beam forming may be used. In the present embodiment, the direction of arrival is an azimuth (an angle) at which a target is present with respect to a reference axis set for the radar device 10.

Based on the direction of arrival and the incoming power estimated in S150, pair matching is performed (S160). The pair matching in S160 is performed as follows: one of the frequency peaks $fbu_1$ to $fbu_m$ obtained from the beat signal BT in the rising section and one of the frequency peak $fbd_1$ to $fbd_m$ obtained from the beat signal BT in the falling section are paired when those two frequency peaks are deemed to indicate that the radar wave has been reflected off an identical target; and the pair is registered. A set of the frequency peaks fbu and fbd matched and registered in S160 is hereinafter referred to as "second frequency pair".

Specifically, in S160 of the present embodiment, it is determined whether the difference in incoming power and the angle difference in the direction of arrival are within a predetermined tolerance, for all the combinations of the frequency peaks fbu in the rising section and the frequency peaks fbd in the falling section. If both the difference in incoming power and the angle difference in the direction of arrival are in the predetermined tolerance, the set of corresponding frequency peaks is determined as a second frequency pair.

Subsequently, for each of the second frequency pairs registered in S160, a distance from the radar device 10 to the target candidate and the relative velocity between the target candidate and the own vehicle are derived using a known method for FMCW radar devices (S170). In S170 of the present embodiment, the velocity of the target candidate is derived based on both the relative velocity between the target candidate and the own vehicle and the vehicle speed of the own vehicle, while it is determined whether the target candidate is a stationary object or a moving object. Information including the derived distance and the derived relative velocity (speed), as well as the azimuth at which the target candidate is present is correlated with the second frequency pair, and then the target candidate is registered.

Subsequently, a filter process including a history connection process and an extrapolation interpolation process is executed (S180).

In the history connection process, a second frequency pair corresponding to an identical target is detected based on information (the distance, velocity, azimuth, and other parameters) on the second frequency pair registered in S160 in a present measurement cycle (such a second frequency pair is hereinafter referred to as "present-cycle second pair") and information on the second frequency pair registered in a previous measurement cycle (such a second frequency pair is hereinafter referred to as "previous-cycle second pair").

Specifically, in the history connection process, based on information on the previous-cycle second pair, the predicted position and predicted velocity of the present-cycle second pair corresponding to the previous-cycle second pair are calculated. When the differences between the predicted position and the predicted velocity and the detected position and the detected velocity determined from the present-cycle second pair (the position difference and velocity difference) are less than the predetermined upper limits (the upper limit of the position difference and the upper limit of the velocity difference), it is determined that history connection has been established. A second frequency pair for which history connection is determined to span over a plurality of measurement cycles (e.g. five cycles) is recognized as a target. Information on the previous-cycle second pair where history connection has been established (for example, the number of times history connection established, and an extrapolation count and an extrapolation flag which will be described later) is sequentially transferred to the present-cycle second pair.

In the extrapolation interpolation process, a target recognized in the present cycle is defined as a present-cycle second target, and a target recognized in the previous cycle is defined as a previous-cycle second target. When there is a previous-cycle second target having no history connection to a present-cycle second target, a second extrapolation pair is generated based on the predicted value of the previous-cycle second target, and the second extrapolation pair is added to the present-cycle second target.

For each of the present-cycle second targets, a second extrapolation flag expressing the presence or absence of extrapolation and a second extrapolation count expressing the number of times of successive extrapolations are set. When the present-cycle second target is a real pair actually detected, an extrapolation flag GF and an extrapolation count are reset to zero. When the present-cycle target is an extrapolation pair, the extrapolation flag GF is set to one, and the extrapolation count is incremented. When the extrapolation count reaches a preset discard threshold, the present-cycle second target is regarded have been lost and discarded.

Subsequently, the process proceeds to S290, described later in detail.

<First Detection Process>

In the first detection process, a DC component reduction process is executed to remove DC components from the beat signal BT, to generate a target signal ad_det(j) (S210).

As illustrated in FIG. 3, the DC component reduction process starts with subtraction of a specified value from each of the sampled values ad(j) of the beat signal BT for each of the reception channels $CH_1$ to $CH_M$ and each of the rising and the falling sections, to calculate an adjusted value ad_dc(j) (S410). As used herein, the reference sign "j" is an identifier identifying the sampling timing of the beat signal BT.

Figure 4A:
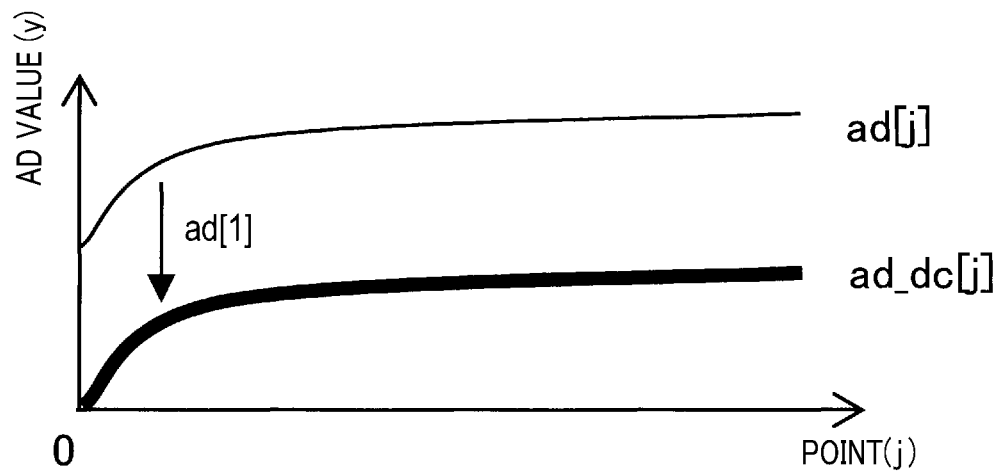
FIG. 4A is a graph illustrating a process of calculating a DC component signal.

In the present embodiment, the specified value is a sampled value ad(1) obtained at the timing when the beat signal BT is first sampled. In S410, the adjusted value ad_dc(j) is calculated using the equation: ad_dc(j)=ad(j)−ad(1). Thus, as illustrated in FIG. 4A, the adjusted value ad_dc(j) is obtained by shifting the sampled values ad(j) of the beat signals BT by the sampled value ad(1) obtained at the timing when the beat signal BT is first sampled. Accordingly, an intercept in the graph of FIG. 4A is set to zero.

Subsequently, in the DC component reduction process, a signal value (x, y) is extracted from the adjusted value ad_dc(j) at each specified time (S420). As used herein, the specified time is a reciprocal of the maximum frequency of the low-frequency components of the beat signal BT specified as the frequency of the DC components. The frequency of the DC components is a frequency component corresponding to an incoming wave from a target at a very short distance.

Figure 4B:
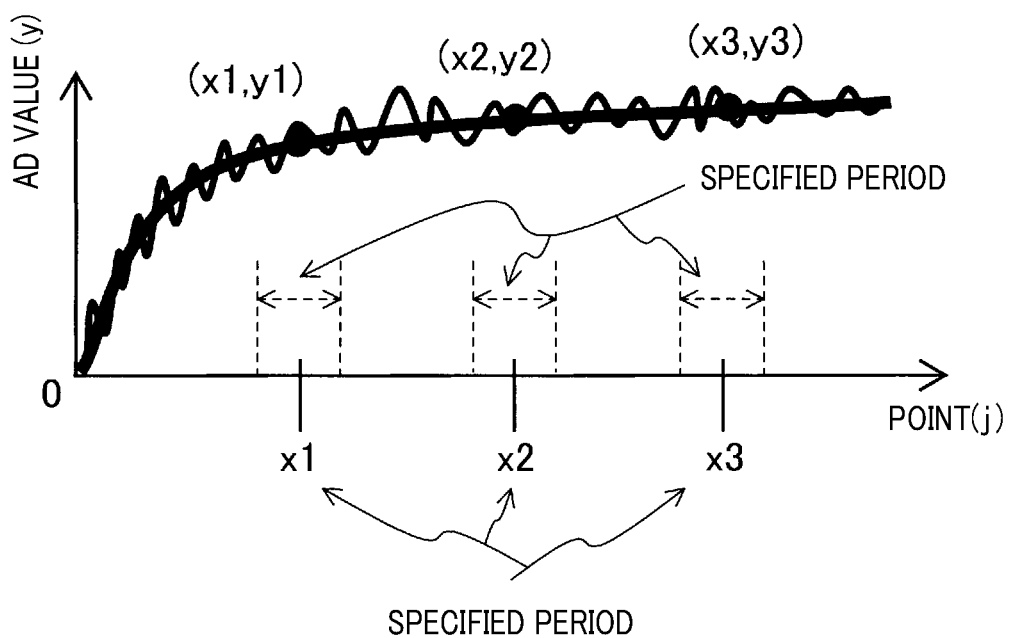
FIG. 4B is a graph illustrating a process of calculating a representative value.

As illustrated in FIG. 4B, the signal value (x, y) extracted in S420 in the present embodiment is a representative value of a length of time (hereinafter referred to as "specified period") specified to include specified times. The representative value extracted in S420 is a result of calculating the arithmetic mean of the adjusted values ad_dc included in the specified period.

However, the representative value extracted in S420 is not limited to a result of calculating the arithmetic mean. The representative value may be a median value of the adjusted values ad_dc included in the specified period, or may be a mode.

In the present embodiment, the signal value (x, y) is extracted for each of the specified times, and thus N signal values (x, y) are extracted for each of the reception channels $CH_1$ to $CH_M$ and in each of the rising and the falling sections. As used herein, "N" is the number of times the signal value (x, y) is extracted in the rising and the falling sections, and is a natural number greater than or equal to 1.

In the DC component reduction process, an approximation curve f(j) expressing the signal waveform of the DC components of the beat signal BT is calculated (S430). Specifically, in S430, simultaneous equations derived by substituting the signal value (x, y) into an nth-order function are solved to determine constants, which are then substituted into the nth-order function. Then, the nth-order function is used to calculate the approximation curve f(j). The approximation curve f(j) is an example of a DC component signal recited in the claims.

Subsequently, in the DC component reduction process, the approximation curve f(j) is subtracted from the adjusted value ad_dc(j) of the beat signal BT, to generate the target signal ad_det(j), which is a signal having the DC components removed from the beat signal BT (S440). Specifically, in S440, the value at the sampling timing j on the approximation curve f(j) derived in S430 is subtracted from the adjusted value ad_dc(j) of the beat signal BT (ad_det(j) =ad_dc(j)−f(j)).

After this processing, the DC component reduction process is terminated, and the process proceeds to the target detection process, and to S220 in the second detection process.

In S220, the target signal ad_det generated in S440 is subjected to frequency analysis (in the present embodiment, FFT) to determine the power spectrum of the target signal ad_det for each of the reception channels $CH_1$ to $CH_M$ and in each of the rising and the falling sections.

In S220, frequency peaks $fbdu_1$ to $fbdu_m$ present on the power spectrum are detected in the rising section, and frequency peaks $fbdd_1$ to $fbdd_m$ present on the power spectrum are detected in the falling section.

Subsequently, in the target detection process, the azimuth detection is performed on the frequency peaks fbdu and fbdd, to estimate both the direction of arrival of a target candidate corresponding to each of the frequency peaks fbdu and fbdd and incoming power expressing the received power of the reflected wave received from the target candidate (S230).

Based on the directions of arrival and the incoming powers estimated in S230, pair matching is performed (S240). The pair matching in S240 is performed as follows: one of the frequency peaks $fbdu_1$ to $fbdu_m$ obtained from the beat signals BT in the rising section and one of the frequency peak $fbdd_1$ to $fbdd_m$ obtained from the beat signals BT in the falling section are paired when those two frequency peaks are deemed to indicate that the radar wave has been reflected off an identical target; and the pair is registered. A set of the frequency peaks fbdu and fbdd matched and registered in S240 is hereinafter referred to as "first frequency pair".

Subsequently, for each first frequency pair registered in S240, a distance from the radar device 10 to the target candidate and the relative velocity between the target candidate and the own vehicle are derived using a known method for FMCW radar devices (S250).

A filter process including a history connection process and an extrapolation interpolation process is executed (S260).

In the history connection process, a first frequency pair corresponding to an identical target registered in S260 in the present measurement cycle (such a first frequency pair is hereinafter referred to as "present-cycle first pair") is detected based on information on the first frequency pair (the distance, velocity, azimuth, and other parameters) and information on a frequency pair registered in the previous measurement cycle (hereinafter referred to as "previous-cycle first pair").

Specifically, in the history connection process, based on information on the previous-cycle first pair, the predicted position and the predicted velocity are calculated for the present-cycle first pair to corresponding to the previous-cycle first pair. When the differences between the predicted position and the predicted velocity and the detected position and the detected velocity determined from the present-cycle first pair (the position difference and velocity difference) are less than the predetermined upper limits (the upper limit of the position difference and the upper limit of the velocity difference), it is determined that history connection has been established. A first frequency pair for which history connection is determined to span over a plurality of measurement cycles (for example, five cycles) is recognized as a target. Information on the previous-cycle first pair with history connection (for example, the number of times history connection established, and an extrapolation count and an extrapolation flag which will be described later) is sequentially transferred to the present-cycle first pair.

In the extrapolation interpolation process, a target recognized in the present cycle is defined as a present-cycle first target, and a target recognized in the previous cycle is defined as a previous-cycle first target. When there is a previous-cycle first target having no history connection to a present-cycle first target, an extrapolation pair is generated based on the predicted value of the previous-cycle first target, and the extrapolation pair is added to the present-cycle first target.

For each of the present-cycle first targets, an extrapolation flag expressing the presence or absence of extrapolation and an extrapolation count expressing the number of times of successive extrapolations are set. When the present-cycle first target is a real pair actually detected, an extrapolation flag GF and an extrapolation count are reset to zero. When the present-cycle first target is an extrapolation pair, the extrapolation flag GF is set to 1, and the extrapolation count is incremented. When the extrapolation count reaches a preset discard threshold, the present-cycle first target is regarded to have been lost and discarded.

Subsequently, the target detection process proceeds to S290.

In S290, based on the result of the filter process in S180 and the result of the filter process in S260, a target detected both in the first and second detection processes is detected as a confirmed target. In other words, in S290, when both the target detected in the first detection process and the target detected in the second detection process are present at an identical position, it is determined that the target is present with high probability.

In the target detection process, the pieces of target information on the confirmed target detected in S290 are outputted to the driver assistance ECU 60 (S300).

After this processing, the target detection process in the present cycle is terminated.

Advantageous Effects of Embodiment

As described above, in the first detection process of the target detection process, the approximation curve f(j) of a plurality of signal values (x, y) is calculated from the plurality of signal values (x, y) extracted for each of the specified times. The approximation curve f(j) is approximated to a signal that is obtained by passing the beat signal BT through a low-pass filter having the cutoff frequency set to the frequency of the DC components.

In the first detection process of the target detection process, the calculated approximation curve f(j) is subtracted from the adjusted value ad_dc(j) of the beat signal BT, to generate the target signal ad_det(j), that is, a signal obtained by removing the DC components from the beat signal BT. The DC components are a frequency components corresponding to an incoming wave from the target at a very short distance. Thus, the frequency components corresponding to the incoming wave from the target at a very short distance are removed from the target signal ad_det(j).

Figure 5:
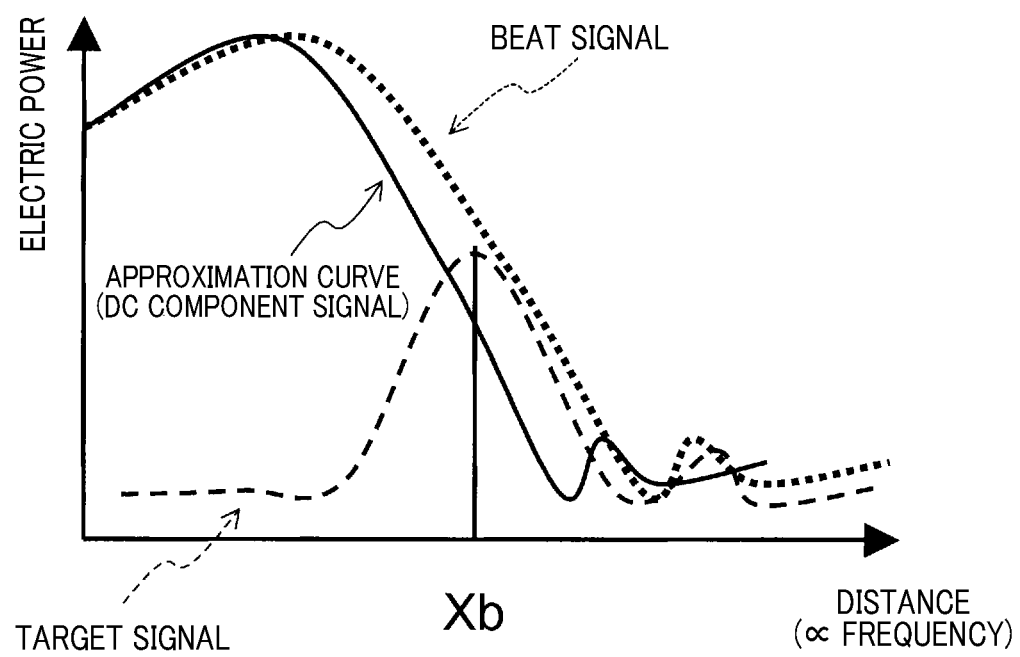
FIG. 5 is a graph illustrating frequency analyses performed on a beat signal, an approximation curve, and a target signal.

In the first detection process of the target detection process, the target signal ad_det(j) is subjected to frequency analysis (FFT) so that the target having reflected the radar wave is detected. As illustrated in FIG. 5, frequency analysis (FFT) of the target signal ad_det(j) results in no detection of the frequency peak of the DC components.

In other words, in the radar device 10, an incoming wave from a target at a very short distance (such a target is hereinafter referred to as "nearby target") is buried in an incoming wave from a target at a very short distance. This configuration enables the radar device 10 to have an improved accuracy of detecting a nearby target.

This configuration of the radar device 10 thus prevents reduction in the accuracy of detecting a nearby target present in a range within which a target is supposed to be detected.

Moreover, in the first detection process of the target detection process, the target signal ad_det(j) to be subjected to frequency analysis is obtained by subtracting the approximation curve f(j) formed of the DC components of the beat signal BT from the beat signal BT.

Thus, this configuration of the radar device 10 inhibits decrease in the level of the beat signal, which is based on the incoming wave from a target at a long distance within which a target is supposed to be detected.

This configuration of the radar device 10 thus prevents reduction in accuracy of detecting a target at a long distance within which a target is supposed to be detected.

As described above, the radar device 10 has an improved accuracy of detecting a target.

Generally, the level of the beat signal BT slightly varies with time.

Thus, depending on the timing when the signal value (x, y) is extracted, noise other than the DC components may be included as the signal value (x, y).

Therefore, in S420 of the DC component reduction process, the representative value of the specified period including specified times is extracted as the signal value (x, y).

Thus, according to the DC component reduction process, the noise of the approximation curve f(j) can be smoothed, and the accuracy of calculating the approximation curve f(j) can be improved.

In S410 of the DC component reduction process, the sampled value ad(1) at the timing when the beat signal BT is first sampled is subtracted from the sampled values ad(j) of the beat signals BT.

In other words, in S410 of the present embodiment, the order of the approximation curve f(j) is lowered by one order.

Thus, according to the DC component reduction process of the present embodiment, the throughput necessary for the arithmetic operation to derive the approximation curve f(j) decreases.

In S290 of the target detection process of the present embodiment, the target detected both in the first and second detection processes is detected as a confirmed target. Thus, the radar device 10 of the present embodiment has an improved accuracy of detecting a target.

POSSIBLE EMBODIMENTS

An embodiment of the present disclosure has so far been described. However, the present disclosure should not be construed as being limited to the embodiment. The present disclosure can be implemented in various forms without departing from the spirit of the present disclosure.

For example, in the target detection process of the foregoing embodiment, the first and second detection processes are executed simultaneously. However, the first and second detection processes do not need to be executed simultaneously.

In the foregoing present disclosure, the second detection process may be eliminated. In that case, S290 of the target detection process may be eliminated. In S300 of the target detection process in that case, pieces of target information on targets having history connection successively established for a predetermined number of times is output as a result of the history connection process in S260.

In S300 of the foregoing embodiment, target information on the confirmed target is output. However, an object target information of which is to be output is not limited to a confirmed target. Target information on all the targets detected in either of the first detection process and the second detection process may be output. In that case, a flag indicating that the target is present with high probability may be set for target information on all the targets detected in both the first and second detection processes.

In the first detection process of the foregoing embodiment, the DC component reduction process is performed on all the channels CH to detect a target. However, the number of the channels CH to be subjected to the first detection process may be one. In that case, S290 may be performed based on the distance to the target detected in the first detection process.

The foregoing embodiment has been described considering application to FMCW radars. However, the application of the present disclosure is not limited to FMCW radars. For example, the present disclosure may be applied to dual frequency continuous-wave (CW) radars or CW radars.

Note that, the foregoing embodiment can be implemented with part of the configuration thereof omitted. The foregoing embodiment can be implemented using an appropriate combination of the foregoing embodiment and a modification. Any embodiments of the present disclosure can be implemented as long as the embodiments are those conceivable within the nature of the invention specified by the wording of the claims.

Besides the foregoing target detector, the present disclosure can be implemented in various forms, such as computer programs for detecting targets, and target detection methods.

REFERENCE SIGNS LIST

1 . . . On-vehicle system
10 . . . Radar device
32 . . . Oscillator
33 . . . Amplifier
34 . . . Divider
36 . . . Transmission antenna
40 . . . Reception antenna unit
42 . . . Reception switch
43 . . . Mixer
44 . . . Amplifier
45 . . . Filter
46 . . . A/D converter
50 . . . Signal processor
60 . . . Driver assistance ECU
80 . . . Notification device

The invention claimed is:

1. A target detector comprising:
transmitting means for transmitting a radar wave formed of continuous waves at a specified cycle;
receiving means for receiving incoming wave that is a reflected wave of the radar wave transmitted from the transmitting means and mixing the received incoming wave with the radar wave transmitted from the transmitting means, to generate a beat signal;
direct current (DC) calculating means for extracting a signal value from the beat signal generated by the receiving means for each of specified times, the specified times each being a reciprocal of a DC component frequency, and calculating an approximation curve of a plurality of extracted signal values as a DC component signal;
signal generating means for subtracting the DC component signal calculated by the direct current calculating means from the beat signal generated by the receiving means, to generate a target signal; and
first detecting means for detecting a first target that is a source of a first incoming wave, based on a result of frequency analysis performed on a first target signal generated by the signal generating means.

2. The target detector according to claim 1, wherein the beat signal comprises high-frequency components and low-frequency components,
wherein a maximum frequency of the low-frequency components of the beat signal is specified as the DC component frequency, and
wherein the DC component signal is obtained by passing the beat signal through a low-pass filter having the cutoff frequency set to the DC component frequency.

3. The target detector according to claim 1, wherein
the direct current calculating means extracts a representative value of each of specified times as the signal value, the specified times each being a length of time specified so as to include the specified time period.

4. The target detector according to claim 1, wherein
the direct current calculating means defines the number of extractions of the signal values as N, and expresses the approximation curve by an nth-order function.

5. The target detector according to claim 4, wherein
the direct current calculating means calculates the DC component signal, with an intercept of the nth-order function set to zero.

6. The target detector according to claim 1, wherein
second detecting means for detecting a second target that is a source of a second incoming wave, based on a result of frequency analysis performed on a second beat signal generated by the receiving means; and
determining means for determining that a target is present in response to the first target and the second target both being present at an identical position, based on a result of detection performed by the first detecting means and on a result of detection performed by the second detecting means.

7. The target detector according to claim 1, wherein:
the receiving means receives incoming waves at each of a plurality of reception antennas and generates beat signals of incoming waves received by each of the plurality of reception antennas; and
the direct current calculating means calculates the DC component signal for a beat signal among the beat signals of the respective reception antennas generated by the receiving means.

8. The target detector according to claim 1, wherein:
the receiving means receives the incoming wave at each of a plurality of reception antennas and generates beat signals of incoming waves received by each of the plurality of reception antennas; and
the direct current calculating means calculates the DC component signal for at least two beat signals among the beat signals of the reception antennas generated by the receiving means.

9. A target detection method comprising steps of:
transmitting a radar wave formed of continuous waves at a specified cycle;
receiving an incoming wave that is a reflected wave of the transmitted radar wave;
mixing the received incoming wave with the transmitted radar wave, to generate a beat signal;
extracting a signal value from the beat signal for each of specified times, the specified times each being a reciprocal of a DC component frequency;
calculating an approximation curve of a plurality of the extracted signal values as a DC component signal;
generating a target signal by subtracting the DC component signal from the beat signal; and
detecting a first target that is a source of the incoming wave, based on a result of frequency analysis performed on the target signal.

10. The target detection method according to claim 9, wherein the beat signal comprises high-frequency components and low-frequency components,
wherein a maximum frequency of the low-frequency components of the beat signal is specified as the DC component frequency, and
wherein the DC component signal is obtained by passing the beat signal through a low-pass filter having the cutoff frequency set to the DC component frequency.

11. The target detection method according to claim 9, wherein
a representative value of each of specified periods are extracted as the signal value, each specified period being a length of time specified so as to include the specified times.

12. The target detection method according to claim 9, wherein
the number of extractions of the signal values is defined as N, and the approximation curve is expressed by an nth-order function.

13. The target detection method according to claim 12, wherein the DC component signal is calculated, with an intercept of the nth-order function set to zero.

* * * * *